Nov. 15, 1927.
G. H. HIGGINS
1,649,695
APPARATUS FOR GROOVING PISTON RINGS AND THE LIKE
Original Filed March 25, 1921   6 Sheets-Sheet 1
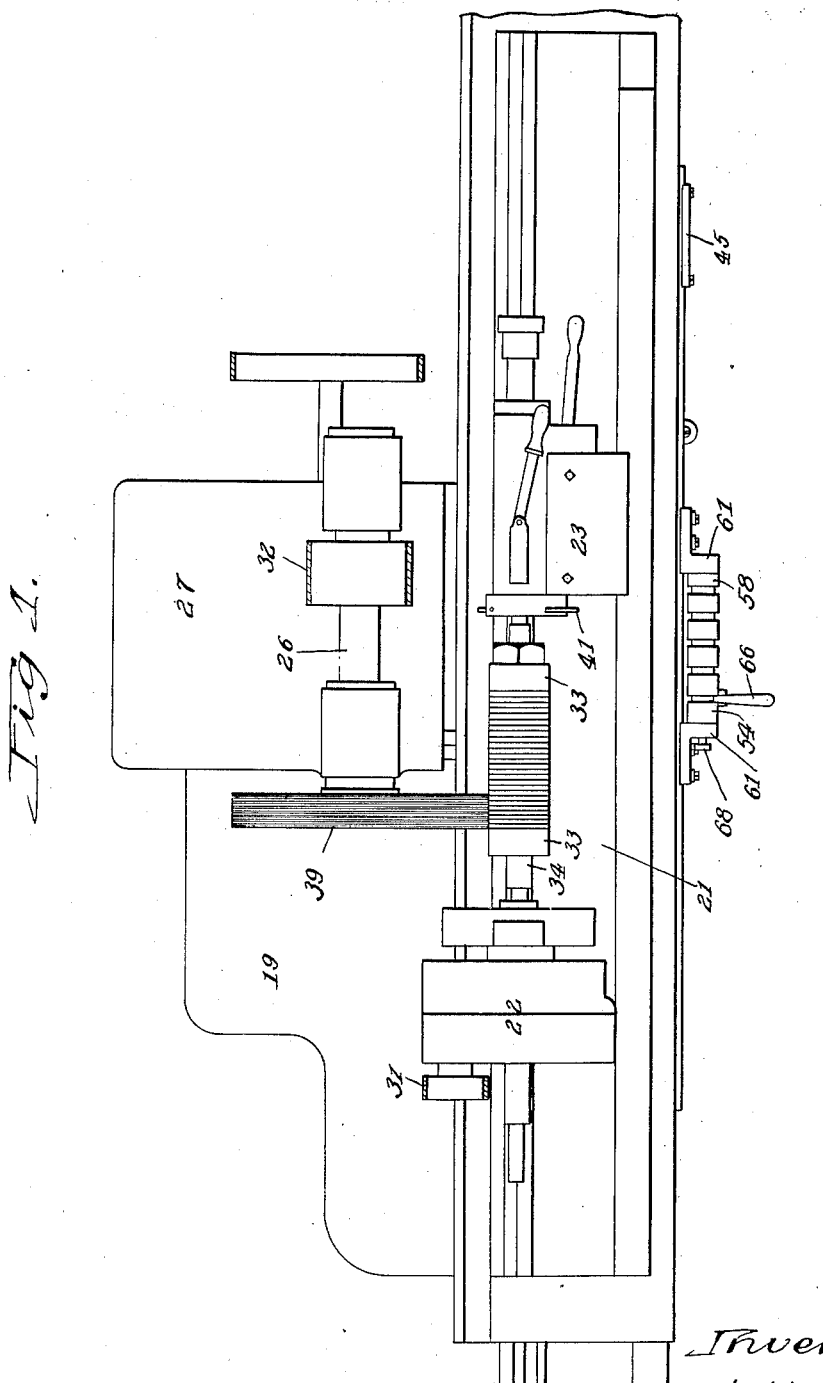

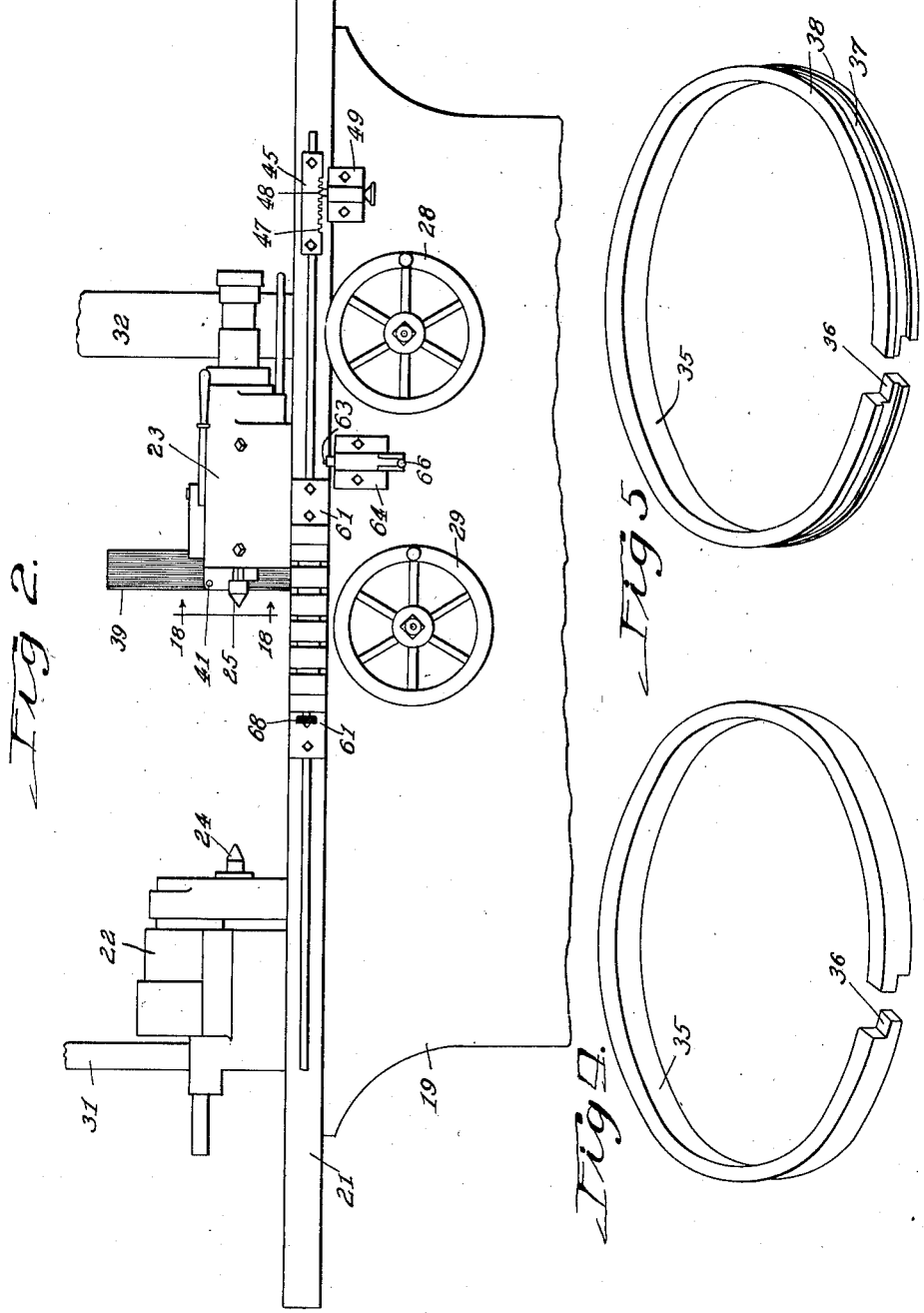

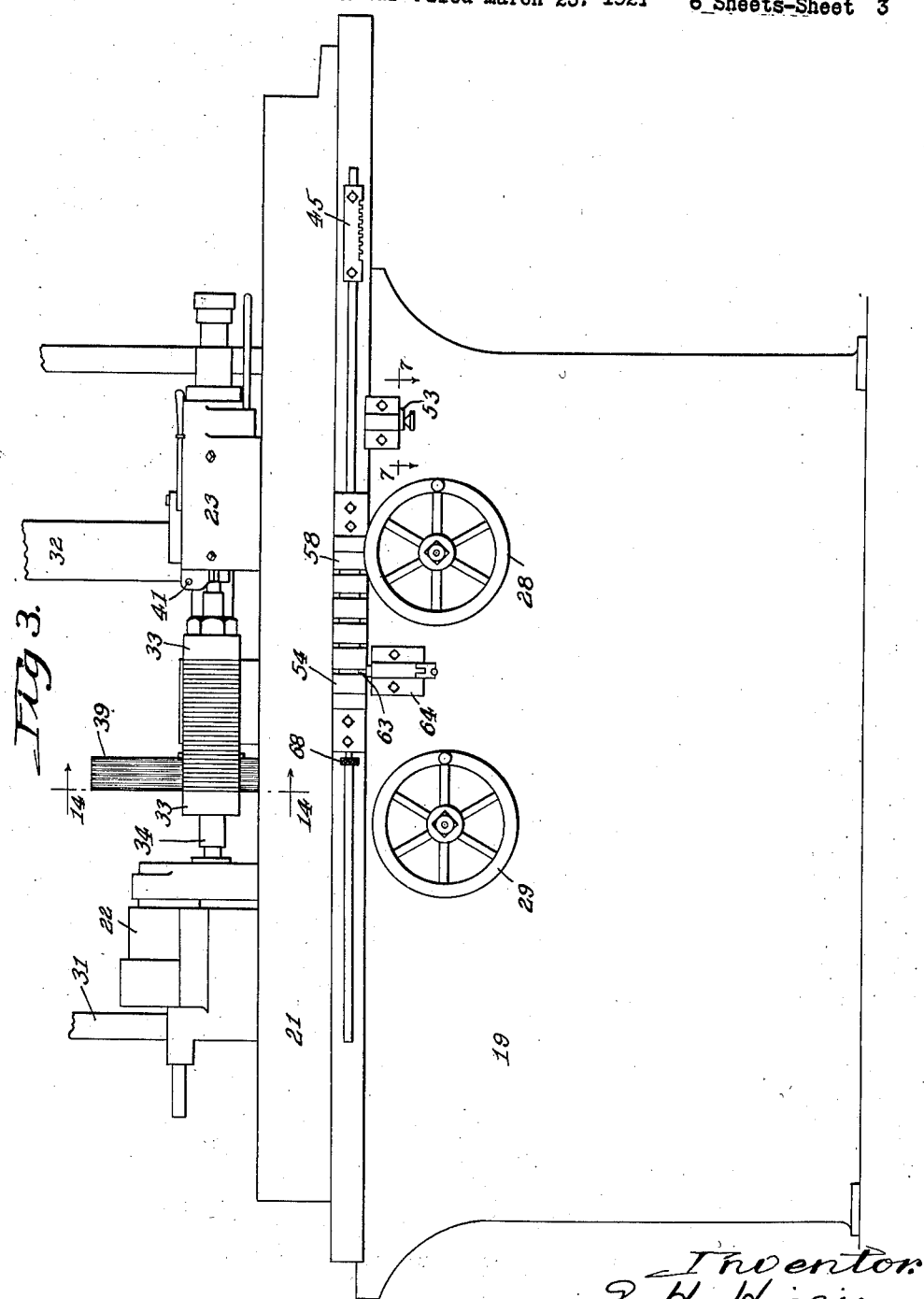

Nov. 15, 1927.
G. H. HIGGINS
1,649,695
APPARATUS FOR GROOVING PISTON RINGS AND THE LIKE
Original Filed March 25, 1921    6 Sheets-Sheet 4
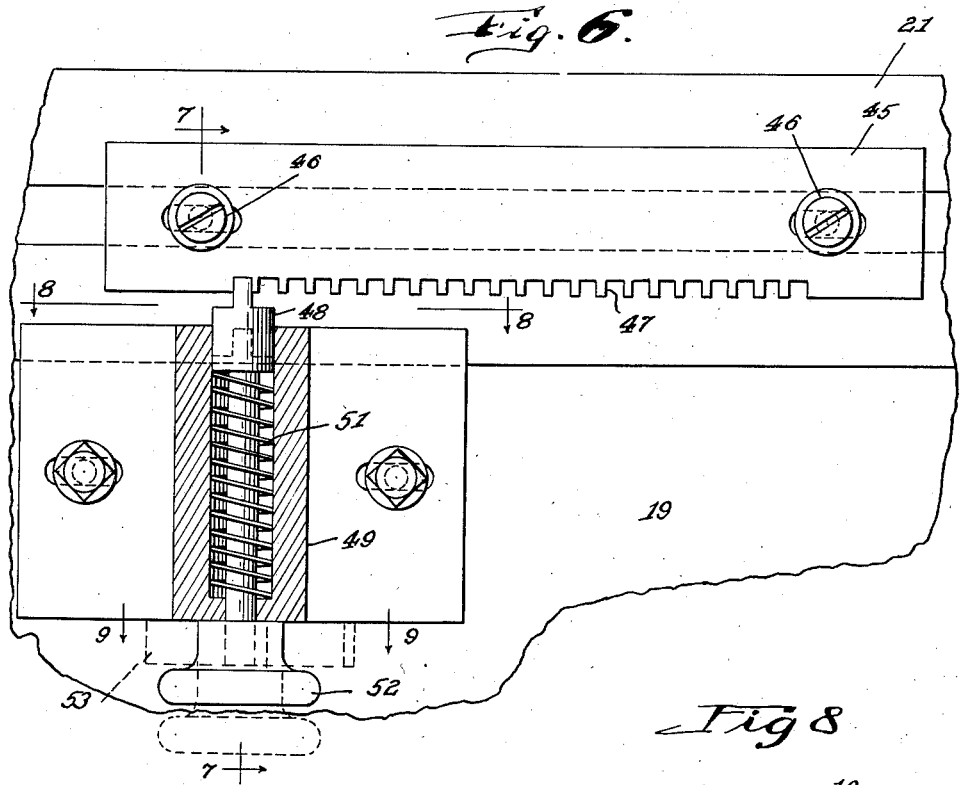
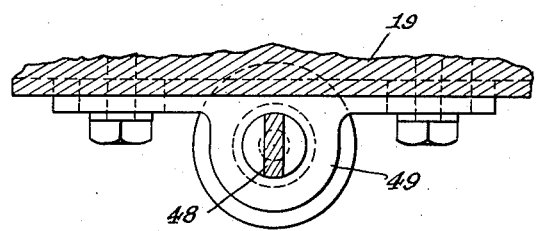
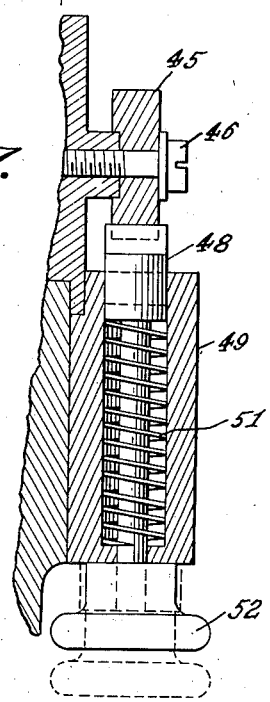
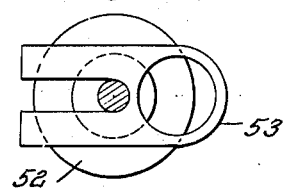
Inventor
G. H. Higgins
By Wilson & McGuinn
Attys.

Nov. 15, 1927.
G. H. HIGGINS
1,649,695
APPARATUS FOR GROOVING PISTON RINGS AND THE LIKE
Original Filed March 25, 1921    6 Sheets-Sheet 5
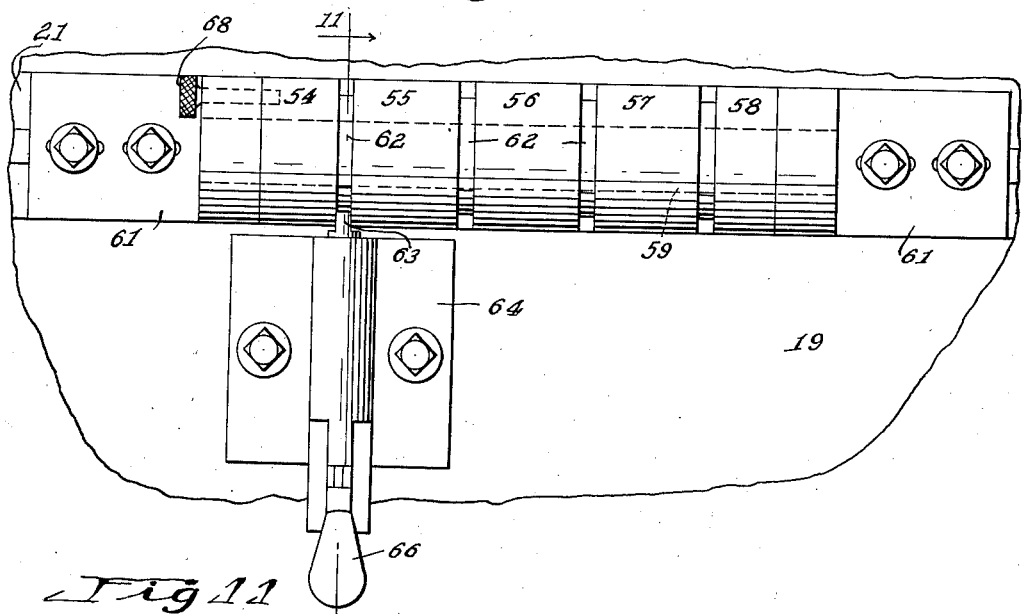
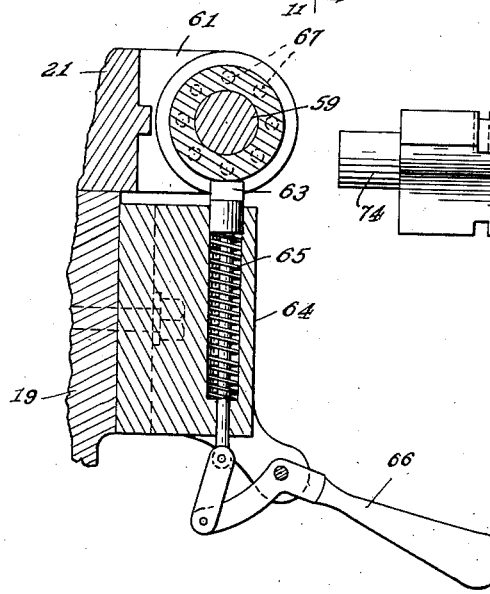
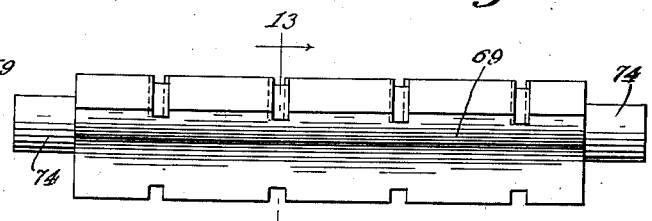
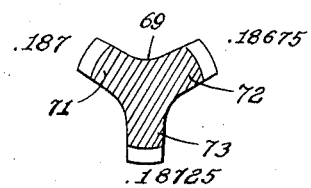

Nov. 15, 1927. 1,649,695
G. H. HIGGINS
APPARATUS FOR GROOVING PISTON RINGS AND THE LIKE
Original Filed March 25, 1921   6 Sheets-Sheet 6
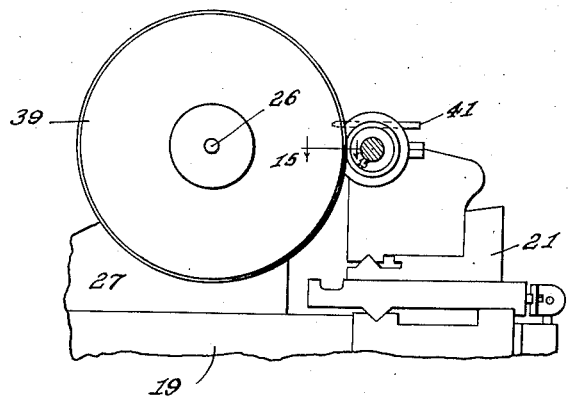
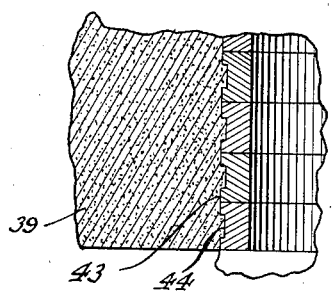
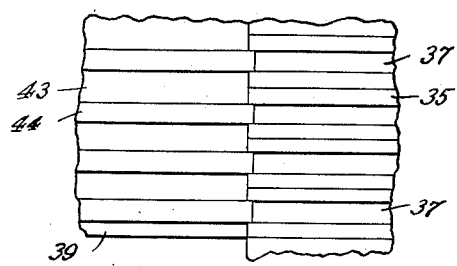
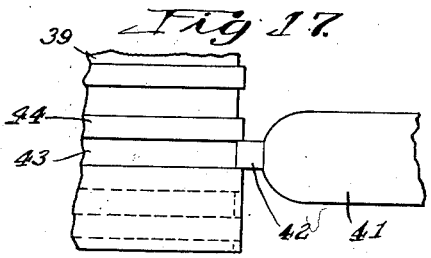
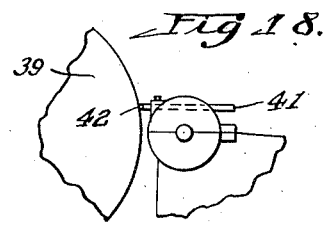

Patented Nov. 15, 1927.

1,649,695

UNITED STATES PATENT OFFICE.

GEORGE H. HIGGINS, OF ROCKFORD, ILLINOIS, ASSIGNOR TO BURD HIGH COMPRESSION RING COMPANY, OF ROCKFORD, ILLINOIS, A CORPORATION OF ILLINOIS.

APPARATUS FOR GROOVING PISTON RINGS AND THE LIKE.

Original application filed March 25, 1921, Serial No. 455,690, Patent No. 1,555,853, dated October 6, 1925. Divided and this application filed April 7, 1924. Serial No. 704,601.

This invention relates in general to the production of piston rings, and has more particular reference to shaping the peripheries of the rings by grinding grooves therein. The object of so grinding a ring is set forth fully in Patent No. 1,356,258. It will suffice to state that it is desired to form a shallow groove in the periphery of a piston ring or the like.

The principal object of the present invention is to provide apparatus for peripherally grooving piston rings to a high degree of accuracy and precision as regards dimensions and location of each groove and to attain this result most expeditiously, thereby promoting economy in production of these articles.

In furtherance of the foregoing, I have devised a novel method of operation and novel apparatus whereby this method may be utilized. The method disclosed herein is the subject matter of my application Serial Number 455,690, filed March 25, 1921, which eventuated in Patent 1,555,853, on October 6, 1925, of which the present application is a division. In illustrating the principles of my invention I employ a well known type of grinding machine characterized by a reciprocating carriage, carrying live and dead centers between which the work is supported, and a grinding wheel carriage adjustable in a plane transverse to the feed of the work carriage. I have proposed to peripherally groove the grinding wheel by means of a suitable tool carried by the work carriage and adapted to be accurately positioned by means of a gage for cutting a predetermined profile in the periphery of said wheel. An arbor carrying a stack of piston rings which have been previously ground to final diameter is mounted between the centers. The work carriage will now be set in predetermined relation to the grinding wheel as determined by a ring locating gage, in which position a series of rings at one end of the arbor will be grooved by feeding the grinding wheel into the rings. This operation will be repeated by successively positioning and locating each series of rings in alignment with the grinding wheel, until all of the rings have been grooved. The matter of locating each series of rings in proper alignment with the grinding wheel so that the groove in each ring will be disposed midway between its sides, is of considerable importance and requires a high degree of accuracy in the devices employed for this purpose. Furthermore, in view of variations in the widths of different batches of piston rings, special attention must be directed to different positioning of the rings with respect to the grinding wheel in order that no discrepancy shall occur, which might by the successive positioning of the additional series, be multiplied so that when the last series is ground, the grooves would be out of center on the respective rings.

My invention also contemplates the grooving of piston rings or similar objects according to a method based on a standard of dimension taken from the particular size of a ring to be ground. The given width of the ring forms the standard. In the event that there is a variance of one or more thousandths of an inch above or below this mean dimension, the rings are classed accordingly. My novel method provides for effecting accurate alignment of the rings of any one of said classes with a grinding wheel so that the grooves may be expeditiously ground to a high degree of precision considering the nature of the work.

While the foregoing touches briefly on the novel method and apparatus, it should be understood that I have contemplated further objects as regards certain phases of the invention which can be better understood from the following description.

Referring to the drawings,—

Figure 1 is a plan view of a grinding machine embodying my invention;

Fig. 2, a front view of the machine with the carriage set in position for profiling the grinding wheel;

Fig. 3, a similar view with the carriage in position for grinding the first series of rings;

Figs. 4 and 5, perspective views of a piston ring before and after grinding;

Fig. 6, an enlarged front view partly in section, of the wheel profiling gage mechanism;

Figs. 7, 8 and 9, detail sectional views taken on the lines 7—7, 8—8 and 9—9, respectively, of Fig. 6;

Fig. 10, an enlarged front view of the ring locating gage mechanism;

Fig. 11, a sectional view taken on the line 11—11 of Fig. 10;

Fig. 12, a detail view of a modified form of ring locating gage;

Fig. 13, a section taken on the line 13—13 of Fig. 12;

Fig. 14, a detail cross section taken substantially on the line 14—14 of Fig. 3;

Fig. 15, a detail sectional view taken on the line 15—15 of Fig. 14;

Fig. 16, a top view of the parts shown in Fig. 15;

Fig. 17, a detail view of the diamond tool in cutting relation to the grinding wheel; and Fig. 18, a detail view taken substantially on the line 18—18 of Fig. 2.

In illustrating my novel method and the apparatus forming the subject matter of the present invention whereby the method is performed, I employ in part a grinding machine of ordinary and well known construction; hence I have deemed it necessary to illustrate only such parts of the machine as are essential for an understanding of the present invention. The well known parts comprise a bed 19, a carriage 21 reciprocable thereon, a head stock 22 and a tail stock 23 mounted on the work carriage, and equipped with live and dead centers 24 and 25 respectively, and a grinding wheel spindle 26 mounted on a carriage 27, which in turn is mounted on the bed 19 to move crosswise, that is, transverse to the axis of the work centers. Hand wheels 28 and 29 at the front of the machine are connected with the carriages 21 and 27 respectively by mechanism, not shown, for feeding the former lengthwise on the bed and the latter crosswise. The spindle in the head stock 22 may be driven by any suitable means such as a belt 31, and the grinding wheel spindle 26 by a belt 32.

The piston rings to be grooved are stacked between collars 33 on an arbor 34 which is adapted to be supported upon and between the centers 24 and 25, and is rapidly revolved by reason of a suitable connection between the arbor and a face plate on the driving spindle. Figs. 4 and 5 show a ring 35 before and after it is grooved. It will be noted that this particular ring has a step joint 36, and that the groove 37 is formed in the peripheral surface midway between the sides 38. The form of joint is of no importance as my invention relates to the grooving of any piston ring and in fact, to the grooving of any article or articles by means of apparatus herein disclosed. It is assumed that the rings on the arbor 34 have been ground to final diameter.

Piston rings are made in different sizes, consequently the width, that is, the dimension between the sides 38, varies. Inasmuch as it is desired that the groove 37 shall be in predetermined relation to the sides 38 of the ring, and since the rings vary in width, it is necessary that a special grinding wheel be employed for grinding the rings of each size. I have therefore, provided means for cutting the periphery of a grinding wheel 39 to a predetermined profile, whereby a series of rings may be accurately grooved in a single operation. This means comprises a tool 41 adjustably secured to the tail stock 23 and carrying a diamond point 42, or any suitable cutting point shaped for forming alternate grooves 43 and cutting or grooving ridges or ribs 44 in the peripheral surface of the grinding wheel. These grooves and ribs cut the grooves in the piston rings and are formed by successively feeding the grinding wheel into the tool at different positions of the latter, controlled by a wheel profile gage mechanism, shown in detail in Figs. 6 to 9, inclusive. In these figures it will be observed that a pattern plate 45 secured by bolts 46 to the work carriage 21 and adjustable lengthwise on said carriage, is shaped to provide a serrated surface, the notches 47 of which are equally spaced apart and are of such dimension as to produce the desired profile on the grinding wheel for grooving piston rings of a given size. A detent 48 carried by a suitable bracket 49 adjustably secured to the bed 19, is shaped to tightly fit one of the notches 47 and is adapted to be moved by a spring 51 into such notch and to be withdrawn by means of a knob 52. Suitable means, such as a block 53, may be employed for holding the detent 48 in an inoperative position. By means of the foregoing construction, the grinding wheel may be very accurately profiled, it being obvious that this is done by positioning the diamond tool in alignment with the grinding wheel at one edge thereof, as for example at the left hand edge, viewing Fig. 2, in which position any one of the first few notches 47 at the right hand end of the gage plate 45, as shown in Fig. 6, would be engaged by the detent 48; then feeding the grinding wheel into the cutting tool forming a groove 43; then retracting the grinding wheel and detent 48 and feeding the carriage 21 to the right a distance regulated by location of the detent in the next succeeding notch 47; then cutting a groove in the grinding wheel as determined by this notch; and repeating this operation until the grinding wheel has been grooved throughout its length.

I have now provided a ring-locating gage mechanism, whereby each of a plurality of series of rings on the arbor may be successively positioned in alignment with the grinding wheel with such degree of accuracy and precision as to uniformly groove the rings. This mechanism, shown best in Figs. 10 and 11 comprises in the present example, a series of collars 54 to 58 inclusive, supported on a shaft 59, in turn supported by brackets 61 adjustably secured to the work carriage 21. By means of washers 62, the adjoining collars are spaced apart a uniform distance forming grooves in which a detent 63 is adapted to engage. This detent carried by a bracket 64 adjustably secured to the bed 19, is constantly urged into operative position by a spring 65 and adapted to be retracted by a hand lever 66. When the work carriage is positioned as shown in Figs. 1, 3 and 10 with the detent 63 located in the groove between the blocks 54 and 55, the rings at the extreme left hand end of the arbor will be located in working alignment with the grinding wheel, so that when the latter is fed into the rings the ribs 44 of the wheel will grind grooves midway between the sides of the ring, as shown plainly in Fig. 15. In this regard it will be noted that the ring locating gage mechanism bears a definite relation to the wheel profiling gage mechanism and to the grinding wheel in order that the rings on the arbor shall properly register with the profile on the grinding wheel. When now the rings of the first series have been ground to the proper depth, the lever 66 will be depressed, permitting the work carriage to be fed to the machine by means of the hand wheel 28 until the detent 63 engages in the next succeeding groove. In this position a new series of rings will be located in proper alignment with the grinding wheel and may be ground thereby. This operation will be repeated until all of the rings have been ground. It will be observed that in order to insure uniformity of the location of the grooves in the respective rings, it is necessary that the rings shall be of uniform width and that this width shall constitute a standard of dimension upon which the dimensions of both the wheel profiling gage mechanism and the ring locating gage mechanism are based. In the event that the rings are one or more thousandths of an inch above or below this standard, it will be seen that an appreciable discrepancy will result by the time this difference has been multiplied throughout the several series of rings. As a consequence, while the grooves in the first series of rings might be properly located, those in the last series would be to a greater or less degree out of center on their respective rings. In order to avoid such discrepancy, each batch of rings is gaged and suitably labeled as "mean", "above" and "below", or words to this effect, or the exact dimensions, such for example as .187, .18725 and .18675. Three sets of ring locating gage collars or blocks are, therefore, provided, each for rings of one of these classes. In each set, there will be such difference in the length of the respective collars or blocks as to secure the proper positioning of the rings of its class in alignment with the grinding wheel profile. It will, of course, be obvious that the gage blocks will not be changed frequently, as this would necessitate considerable time and labor. Instead, the rings are properly divided and classified, and run through the machine in batches appropriate for the particular gage on the machine. In order to further insure precision which might otherwise be impaired by slight wear between the detent 63 and the gage blocks, I have provided for rotatably adjusting the blocks as a unit to present new gage surfaces. In the present case, one of the end blocks as 54 is provided with a series of circumferentially spaced holes 67, in any one of which a locking pin 68 is adapted to be engaged. It will be obvious that in the present case eight adjustments are provided, thereby increasing the life of the gage blocks that many times.

In Figs. 12 and 13, I have shown a modified form of ring locating gage block 69, which is fluted, providing gage portions 71, 72 and 73 and which has trunnion ends 74, adapted to be supported in the brackets 61. Each of these gage portions is grooved at longitudinally spaced points somewhat similar to the location of the grooves defined by the collars 54 to 58 inclusive. However, in this instance the spacing between each set of grooves is different, for example that in the portion 71 is for the mean dimension as .187; that in 72 for the undersize as .18675; and in 73 for the oversize as .18725.

From the foregoing it will be apparent that my novel method of grooving piston rings and similar objects consists, preferably but not necessarily, in classifying the rings supposed to be of a given width, into a plurality of classes according to variances in actual width, each class comprising rings within given dimensional tolerance, taking the mean width of the rings of any class as a standard dimension for such class, mounting plural series of rings of the selected class on a rotary supporting means such as an arbor, positioning the first series of rings at one end of the arbor in predetermined alignment with a groove-forming tool the profile of which will cut a groove in each ring in said first series in predetermined relation to its sides, which profile may be formed in any suitable manner, and cutting or grinding grooves in said first series by relative feed movement between the arbor and tool, successively positioning the different remaining series in predetermined alignment with said tool and successively cutting said series, the respective positioning of the plural series in predetermined alignment with the grooving tool being effected by cooperating fixed and movable gage elements, one of which comprises a plurality of elements one for each series of rings on the arbor, said plurality of elements being spaced in accordance with the mean width or said standard dimension of the rings of the selected class. It will be observed that the same grinding wheel or other grooving tool is, preferably but not necessarily, used for grooving the rings comprising the different classes of a given size, such as the different classes above specified, without appreciably impairing the desired accuracy in location of the grooves on the rings of such classes. In practice I employ but a single grinding wheel for each of the three classes of rings supposedly of a given size, the positioning of the first series of rings of each class in alignment with the grinding wheel serving to locate the grinding wheel or tool in predetermined alignment with such rings, and each sucessive setting or positioning serving to respectively, correspondingly align the different series. It will be further observed that the desired predetermined alignment could in practice of the invention be effected by movement of the arbor or other support, instead of the cutting tool. It should be understood that for each size of ring, including in this instance three classes, a separate gage plate 45 and three sets of gage blocks as shown in Fig. 10, or a single gage block as shown in Fig. 13, will be utilized.

It is believed that the foregoing conveys a clear understanding of the principles and objects prefaced above, and while I have illustrated and described but a single embodiment of my novel method and apparatus, with the exception of the modification of the ring locating gage, it should be understood that considerable change might be made in the apparatus employed for practising this method, and also in the several operations for obtaining the desired result without departing from the spirit and scope of the invention as expressed in the appended claims.

I claim:

1. In a ring grooving machine of the character described, the combination of a grinding wheel having the periphery thereof provided with a series of uniformly spaced ribs and grooves spaced according to a standard dimension, means for feeding an arbor carrying a plural series of rings in step by step movements to position new series of rings one by one in alignment with the grinding wheel, and means for accurately locating each series of rings in predetermined alignment with the grinding wheel at each step, the steps each being equal to a space equivalent to the distance between a number of grooves on said wheel.

2. Apparatus for peripherally grooving piston rings comprising, in combination, a bed, a work carriage movable lengthwise on the bed, a rotary arbor mounted on said carriage and adapted to carry a plural series of piston rings, a cross-feed carriage mounted on the bed, a rotary grinding wheel mounted on said cross-feed carriage on an axis parallel with the arbor and having a profile comprising alternate grooves and ribs spaced apart in predetermined relation to the width of the rings on the arbor, means operative between the bed and work carriage for locating each series of rings in succession in predetermind alignment with the grinding wheel, said means including plural sets of locating faces spaced apart and a locating member adapted to engage each face of any set for determining the location of the respective series of rings, said means and locating member being relatively adjustable without disturbing their operative relation for bringing any set of locating faces into operative position.

3. In a machine for the purpose described, a bed, a work carriage movable lengthwise on the bed, a cross feed carriage mounted on the bed, a rotary grinding wheel mounted on said cross feed carriage on an axis parallel to the direction of movement of the work carriage, said grinding wheel having alternate grooves and ribs on the periphery thereof arranged to be spaced apart in predetermined relation to the width of piston rings to be operated upon by the wheel, means operative between the bed and the work carriage for locating the latter in different positions in steps each equivalent to the distance between adjacent grooves on said wheel, and another means operative between the bed and work carriage for locating the latter in different positions in steps each equivalent to the distance between a number of grooves on said wheel.

4. In a piston ring grooving machine, the combination of a head having a plurality of spaced cutters spaced according to a standard dimension, an arbor for supporting and rotating a plural series of rings for operation thereon by said cutters, and means for accurately locating the cutters with successive series of rings in successive steps, the steps each being equivalent to the distance between a number of cutters whereby to groove all of the rings in a number of steps, a series of rings being grooved at each step.

GEORGE H. HIGGINS.